United States Patent
Forget

(10) Patent No.: US 12,463,394 B2
(45) Date of Patent: Nov. 4, 2025

(54) COMPRESSION-FREE AND SINGLE-BEAM GENERATION OF A CARRIER-ENVELOPE PHASE-STABLE OPTICAL PULSE

(71) Applicant: FASTLITE, Antibes (FR)

(72) Inventor: Nicolas Forget, Antibes (FR)

(73) Assignee: FASTLITE, Antibes (FR)

( * ) Notice: Subject to any disclaimer, the term of this patent is extended or adjusted under 35 U.S.C. 154(b) by 868 days.

(21) Appl. No.: 17/764,485

(22) PCT Filed: Sep. 30, 2020

(86) PCT No.: PCT/EP2020/077408
§ 371 (c)(1),
(2) Date: Mar. 28, 2022

(87) PCT Pub. No.: WO2021/064045
PCT Pub. Date: Apr. 8, 2021

(65) Prior Publication Data
US 2022/0368097 A1 Nov. 17, 2022

(30) Foreign Application Priority Data
Oct. 1, 2019 (EP) .................................. 19306254

(51) Int. Cl.
*H01S 3/10* (2006.01)
*G02F 1/35* (2006.01)
(Continued)

(52) U.S. Cl.
CPC ............ *H01S 3/0057* (2013.01); *G02F 1/353* (2013.01); *G02F 1/39* (2013.01); *H01S 3/0092* (2013.01); *H01S 3/0602* (2013.01)

(58) Field of Classification Search
CPC ..... H01S 3/0057; H01S 3/0092; H01S 3/0602
See application file for complete search history.

(56) References Cited

U.S. PATENT DOCUMENTS

2004/0240491 A1  12/2004  Nebel et al.
2005/0271094 A1*  12/2005  Miller ................... H01S 3/0057
                                              372/18
(Continued)

FOREIGN PATENT DOCUMENTS

CN  1273447 A  11/2000
CN  105914566 A  8/2016
(Continued)

OTHER PUBLICATIONS

Cirmi, G. et al. "Carrier-envelope phase stable, few-optical-cycle pulses tunable from visible to near IR," Journal of the Optical Society of America—B, vol. 25, No. 7, Jul. 1, 2008, pp. B62-B69 (8 pages).

(Continued)

*Primary Examiner* — Kinam Park
(74) *Attorney, Agent, or Firm* — Kim & Stewart LLP

(57) ABSTRACT

The present invention is notably directed to methods and systems for generating a CEP-stable optical pulse of optical carrier frequency $f_i$ from input optical pulses, the input optical pulses having an optical carrier frequency $f_p$ and pulse duration $T_p$. A birefringent medium, a non nonlinear medium, a dispersive optical system, a parametric device (DFG) are successively used to achieve the generation.

20 Claims, 3 Drawing Sheets

(51) Int. Cl.
*G02F 1/39* (2006.01)
*H01S 3/00* (2006.01)
*H01S 3/06* (2006.01)

(56) References Cited

U.S. PATENT DOCUMENTS

| | | | |
|---|---|---|---|
| 2006/0209912 A1* | 9/2006 | Luo | G02F 1/3534 |
| | | | 372/75 |
| 2009/0201575 A1* | 8/2009 | Fermann | H01S 3/06754 |
| | | | 359/341.32 |
| 2013/0064256 A1 | 3/2013 | Xu et al. | |
| 2015/0086217 A1* | 3/2015 | Galvanauskas | H01S 3/2383 |
| | | | 398/188 |
| 2018/0337508 A1* | 11/2018 | Liu | G01J 3/0224 |
| 2019/0020166 A1 | 1/2019 | Chang et al. | |
| 2019/0079368 A1* | 3/2019 | Lee | H01S 3/1301 |
| 2019/0155126 A1* | 5/2019 | Pomeranz | H01S 3/2391 |
| 2019/0267767 A1* | 8/2019 | Krausz | H01S 3/2383 |

FOREIGN PATENT DOCUMENTS

| | | |
|---|---|---|
| JP | 2002-214654 A | 7/2002 |
| JP | 2014-522097 A | 8/2014 |
| WO | 2012/121920 A2 | 9/2012 |
| WO | 2017/211374 A1 | 12/2017 |

OTHER PUBLICATIONS

Extended European Search Report mailed Mar. 30, 2020 in European Patent Application No. 19306254.4, 9 pages.
International Search Report and Written Opinion mailed Oct. 20, 2020 in International Application No. PCT/EP2020/077408, 14 pages.
First Office Action mailed Aug. 22, 2024 in Chinese Patent Application No. 202080069199.7 with machine translation, 10 pages.
Notice of Reasons for Refusal mailed Oct. 8, 2024 in Japanese Patent Application No. 2022-520661 with machine translation, 7 pages.

* cited by examiner

COMPRESSION-FREE AND SINGLE-BEAM GENERATION OF A CARRIER-ENVELOPE PHASE-STABLE OPTICAL PULSE

FIELD

Embodiments of the invention relate in general to the field of optical systems and methods for generating carrier-envelope phase-stable (CEP-stable) optical pulse.

BACKGROUND

Pulsed laser sources are characterized by a temporal confinement of the light emission. It is usual to describe the electrical field of these pulses in terms of envelope and carrier. The electrical field of these pulses is the product of an oscillating field with a period noted as $T_0=\lambda_0/c$ (the optical carrier) by a slowly varying function on the scale of $T_0$ (the envelope). For ultrafast laser sources, the duration of the envelope is typically of a few tens of femtoseconds (1 femtosecond=$10^{-15}$ second) which is a duration typically greater than the period of the optical cycle in the near and mid-infrared. At 800 nm, for example, the optical cycle is 2.7 femtoseconds.

For certain applications, pulse durations of the order of a few optical cycles—hereinafter referred to as few-cycle pulses—are advantageous. The electrical field is then close to a transient field, which is a condition favorable for applications such, for example, as harmonic generation in gases or solids. Such pulses make it possible, in particular, to effectively generate attosecond pulses of which the duration can reach a few tens of attoseconds (1 attosecond=$10^{-18}$ second). An example is given by K. Zhao et al. in "*Tailoring a 67 attosecond pulse through advantageous phase-mismatch*", Optics Letters 37, 3891-3893 (2012).

Carrier-envelope phase (CEP) refers to the relative phase between the envelope and the carrier. The shot-to-shot stability of CEP is crucial to retain the properties of the electric field from one pulse to another. Such a stability is of major importance in the context of high harmonic generation, as described by A. Baltuška et al. in "*Attosecond control of electronic processes by intense light fields*", Nature 421, 611 (2003).

CEP may be modified by dispersive elements characterized by non-equal group and phase refractive indices, such as bulk media (glass, gases . . . ) or pairs of angularly dispersive components (pair of gratings, pair of prisms . . . ). Fluctuations of the optical beam path in such dispersive elements is a major source of CEP fluctuations or drifts in ultrafast laser systems.

Filamentation is a nonlinear optical process allowing propagation of a beam of light through a medium without diffraction. This self-guiding phenomenon requires a laser peak power higher than a threshold power named critical power and approximatively equal to $0.15*\lambda_0^2/(8\pi*n0*n2)$ where n0 and n2 are, respectively, the linear and nonlinear optical indices of refraction of the propagation medium. Filamentation of sub-picosecond or picosecond pulses broadens the input pulses through self-phase modulation and other cascaded nonlinear processes, potentially resulting in the generation of broadband spectral continuum. Within some conditions (single-filament regime), filamentation preserve the CEP shot-to-shot stability. Examples of continua generated by sub-picosecond pulses is given in M. Bradler et al in "*Femtosecond continuum generation in bulk laser host materials with sub-µJ pump pulses*", Applied Physics B 97.3 (2009): 561.

The stabilization of the CEP requires elaborate and expensive devices of which the implementation is often complex. It is customary to distinguish between so-called passive and active stabilization methods, depending in the presence (active) or absence (passive) of a feedback mechanism to stabilize the CEP.

As an example of active feedback mechanism to stabilize the CEP, the document S-W Huang et al. "*High-energy pulse synthesis with sub-cycle waveform control for strong-field physics*", Nature Photonics 5, 475-479 (2011) describes a source concept comprising an ultrafast pulse generator of which the CEP phase is actively stabilized, a device for extending the spectrum of these pulses into the infrared, two pulse shapers, two series of optical parametric amplifiers non-collinearly pumped by two pump wavelengths and a phasing system controlled by a measuring device based on cross-correlation detection.

As an example of passive feedback mechanism to stabilize the CEP, the document A. Baltuška et al. "*All-optical self-stabilization of carrier-envelope phase offset in few-cycle pulses by optical parametric amplifiers*", in 13th International Conference on Ultrafast Phenomena, 2002 OSA Technical Digest Series (Optical Society of America, 2002), describes various optical schemes of passive stabilization via second-order nonlinear processes such as difference-frequency generation (DFG).

The generation of ultrafast laser pulses via DFG is described in the literature. In a material having second-order nonlinear optical properties, a first optical pulse of carrier frequency $f_s$, hereafter referred to as "signal" pulse, interacts with a second optical pulses of carrier frequency $f_p>f_s$, hereafter referred to as "pump" pulse. During the interaction, a fraction of the energy of the "pump" pulse is transferred to the "signal" pulse which is amplified. Simultaneously, a third optical pulse is generated and co-amplified. The carrier frequency of this third pulse, referred to as the "idler" pulse, is equal to $f_p-f_s$. The CEP of the "idler" pulse is equal, to within a constant, to the difference between the CEP of the "pump" signal and the CEP of the "signal" pulses. If this difference is constant in a repeatable manner (i.e. from one pulse to another), then the CEP of the "idler" pulse is stable over time, even if neither the "pump" pulse or the "signal" pulse share this property. As DFG is a local and instantaneous process, difference-frequency generation is limited to wavelengths with approximately equal optical group delay on the DFG medium.

Generation of passively-stabilized few-cycle optical pulse through DFG can be divided in two categories.

The first category is referred to as intra-pulse DFG, when the "signal" and "pump" waves originate from a single, broadband, optical beam. An example of intra-pulse DFG is given in C. P. Hauri et al, "*Generation of intense, carrier-envelope phase-locked few-cycle laser pulses through filamentation*" Appl. Phys. B 79(6), 673-677 (2004).

The second category is known as inter-pulse DFG, when the "signal" and "pump" waves are two optical beams propagating along different optical paths, even if one beam is derived from the other one. A common embodiment of this architecture is to generate the "signal" beam from the "pump" by filamentation in a bulk crystal. The document G. Cirmi, C. Manzoni, D. Brida, S. De Silvestri, and G. Cerullo, "*Carrier-envelope phase stable, few-optical-cycle pulses tunable from visible to near IR*" J. Opt. Soc. Am. B 25, B62-B69 (2008). discloses an example of inter-pulse DFG that is illustrated on FIG. 1.

CEP stability of optical pulses generated by intra-pulse DFG is, in principle, superior to that of inter-pulse DFG since "pump" and "signal" share a common optical path, which is also called single beam. However, intra-pulse DFG requires ultra-broadband compressed pulses, which are difficult to produce and manage, especially at the µJ-level. As an example, a bandwidth exceeding 300 THz would be required to generate, through DFG, a CEP-stable pulse at ~1 µm. Compressing such a bandwidth, that is equaling the optical group delays of all frequency components, is a major technical challenge requiring complex and meter-scale technological setups. An example of such a setup is given in Wirth, Adrian, et al. "Synthesized light transients." Science 334.6053 (2011): 195-200.

Furthermore, known systems for the generation of stabilized optical pulse through inter-DFG require the use of mirrors that increase the overall size of such systems. In addition, the presence of beam splitters implies that the light uses different paths, thus causing an instability of the relative path lengths of the "pump" and "signal" beams and, thus, of the CEP of the "idler" beam.

Therefore, there is a need to improve the generation of a CEP-stable optical pulse of a given optical carrier frequency from an input optical pulse, by avoiding both beam splitting and pulse compression.

BRIEF SUMMARY OF THE INVENTION

According to a first aspect, the present invention is embodied as an single-beam and compression-free optical system for generating carrier-envelope phase-stable (CEP-stable) optical pulses of optical carrier frequency $f_i$ from input optical pulses, the input optical pulses having an optical carrier frequency $f_p$ and pulse duration $\tau_p$. The optical system comprises
  a birefringent medium (B) for receiving, in input, the input optical pulses and for providing as output pairs of linearly-polarized pulses (PP), each pair of linearly-polarized pulses (PP) having orthogonal polarization along a first and second directions (E1, E2) with a relative optical group delay approximatively equal to or greater than the pulse duration ($\tau_p$) of the input optical pulses;
  a nonlinear medium (NL) for receiving in input the output of the birefringent medium (B); and for providing as output the pairs of linearly-polarized pulses (PP) with at least one of the two pulses of each pair that is spectrally broadened;
  a transparent dispersive optical system (O) for receiving in input the output of the nonlinear medium (NL) and for providing as output the pairs of linearly-polarized pulses (PP) with total or partial temporal overlap between the two pulses of each pair;
  a parametric device (DFG) for receiving in input the output of the transparent dispersive optical system (O); and for providing as output a frequency-difference between the frequency components polarized along the first direction (E1) and frequency components polarized along the second direction (E2).
The optical system may further comprise:
  a filter (F) for receiving in input the output of the parametric device (DFG) and for providing as output an extraction of the frequency-difference of the output of the parametric device (DFG);
  the filter is a dichroic mirror;
  a wave plate for controlling the polarization state of the input optical pulses;
  an optic that is placed between the optical system (O) and the parametric device (DFG), the optic being adapted to receive in input the output of the dispersive optical system (O) and for focusing the output of the dispersive optical system (O) on the parametric device (DFG);
  the birefringent medium (B) has a thickness that is equal or larger than 100 µm, and said birefringent medium comprises at least one crystal selected among Calcite crystal, Quartz crystal, α-BBO crystal, $YVO_4$, crystal, $TeO_2$ crystal;
  the dispersive optical system (O) comprises at least one material selected among glass window, YAG crystal, thick lens, Calcite crystal, Quartz crystal, α-BBO crystal, $YVO_4$, crystal, $TeO_2$ crystal;
  the nonlinear medium (NL) comprises at least one material selected among YAG crystal, sapphire crystal, calcium fluoride crystal, fused silica window;
  the parametric device (DFG) is a nonlinear crystal of the second order that comprises at least one material selected among β-BBO, LBO, $LiNbO_3$, $LiIO_3$, KTA, LGS, AGS;
  the parametric device (DFG) is a nonlinear crystal characterized by second-order susceptibility;

According to another aspect, the invention can be embodied as a method for generating carrier-envelope phase-stable (CEP-stable) optical pulses of optical carrier frequency $f_i$ from input optical pulses, the input optical pulses having an optical carrier frequency $f_p$ and pulse duration $\tau_p$. The method comprises:
  providing the input optical pulses having an optical carrier frequency $f_p$ and pulse duration $\tau_p$;
  generating from the provided input optical pulses, by a birefringent medium (B), pairs of linearly-polarized pulses (PP), each pair of linearly-polarized pulses (PP) having orthogonal polarization along a first and second directions (E1, E2) with a relative optical group delay at approximatively equal to or greater than the pulse duration ($\tau_p$) of the input optical pulses;
  triggering filamentation, by a nonlinear medium (NL), of at least one of the two pulses of each pair, the at least one of the two pulses of each pair being spectrally broadened as a result of filamentation;
  temporally overlapping (40), by a dispersive optical system (O), the two pulses of each pair from the output of said nonlinear medium (NL); and
  generating, by a parametric device (DFG), a frequency-difference between the frequency components polarized along the first direction (E1) and frequency components polarized along the second direction (E2).
The method may further comprise
  extracting (60), by a filter, the generated frequency-difference;
  focusing (42), by an optic, the output of the optical system (O) on the parametric device (DFG);
  adjusting (12), by a wave plate, the energy split between the two pulses of the pulse pair to be generated by the birefringent medium.

According to another aspect, the invention can be embodied as a light source unit for generating carrier-envelope phase-stable (CEP-stable) optical pulses of optical carrier frequency fi from input optical pulses. The light source unit comprises a pulse generator for delivering the input optical pulse having an optical carrier frequency fp, a pulse duration τp and that is linearly polarized, the optical system adapted to receive the input optical pulse, and an optical amplifier adapted to amplify the output of the optical system.

Systems, products and methods embodying the present invention will now be described, by way of non-limiting examples, and in reference to the accompanying drawings.

BRIEF DESCRIPTION OF SEVERAL VIEWS OF THE DRAWINGS

Similar or functionally similar elements in the figures have been allocated the same reference signs if not otherwise indicated.

DETAILED DESCRIPTION OF EMBODIMENTS OF THE INVENTION

Figure 2:
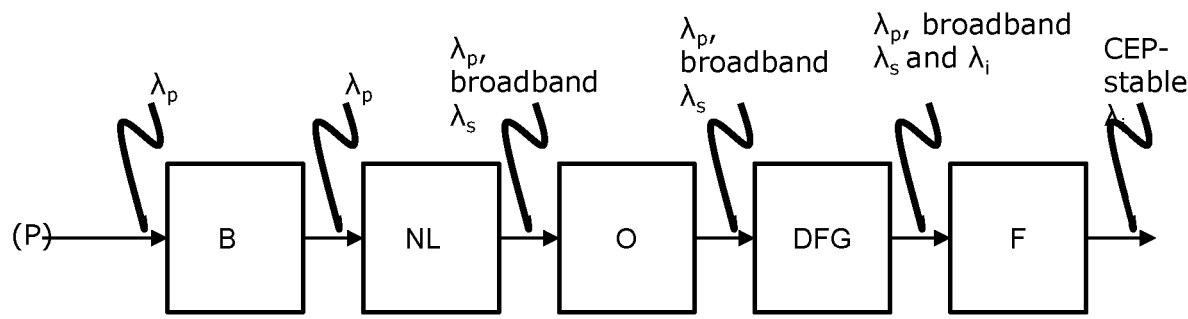
FIG. 2 shows an example of a principle of the system of the invention.

With reference to FIG. 2, it is proposed an optical system for generation of a carrier-envelope phase-stable optical pulses of optical carrier frequency $f_i$ from input optical pulses. Carrier-envelope phase will be referred to as CEP hereinafter. The optical system is adapted to generate CEP-stable optical pulses from input optical pulses that have an optical carrier frequency $f_p$ and pulse duration $\tau_p$. The optical system is thus suitable for (or adapted to) receiving in input the input optical pulses and generating CEP-stable optical pulses that are provided as output of the optical system. The optical system is now discussed.

The system comprises a birefringent medium (B). Birefringence is the optical property of a material having a refractive index that depends on the polarization and propagation direction of light. The simplest type of birefringence is described as uniaxial, meaning that there is a single direction governing the optical anisotropy. Rotating the material around this axis, called the optic axis, does not change its optical behavior. For the sake of simplicity, only uniaxial crystals will be considered in the following. It is however understood that that bi-axial crystals could also be used to produce the desired optical properties.

Light whose polarization is perpendicular to the optic axis of the birefringent medium (B) is governed by a refractive index $n_o$ (for "ordinary"). Light whose polarization is in the direction of the optic axis of the birefringent medium (B) experiences an optical index $n_e$ (for "extraordinary"). The two polarizations (that is, the ordinary and the extraordinary polarizations) are orthogonal along respective first and second directions (E1, E2); the first and second directions are orthogonal. The ordinary and extraordinary group delays are also different; in other words, the time for the optical pulses with the perpendicular polarization to the optic axis to traverse the birefringent medium (B) is not the same as the time for the optical pulses with the polarization in the direction of the optic axis to traverse the birefringent medium (B). The delay is noted T hereinafter.

The delay T notably depends on the thickness of the birefringent medium (B). The delay $\tau$ is given by the following equation (1):

$$\tau = |n_{g,e} - n_{g,o}| * L/c \qquad (1)$$

where $n_{g,e}$ stands for the extraordinary group delay,
$n_{g,o}$ stands for the ordinary group delay,
L for the thickness of the medium,
c for the speed of light in vacuum.

The birefringent medium (B) is adapted to split an input optical pulse into two linearly-polarized pulses. The two linearly-polarized pulses at the output of the birefringent medium (B) are consecutive and separated by a time delay equal to $\tau$. Thus, the birefringent medium (B) generates, for each input optical pulse, a pair of orthogonal linearly-polarized pulses: one polarized pulse is perpendicularly polarized in the direction of the optic axis (the first direction) of the birefringent medium (B)—the ordinary-polarized pulse-, one polarized pulse is polarized is in the direction of the optic axis (the second direction) of the birefringent medium (B)—the extraordinary-polarized pulse-. The pulses of the pair may be consecutive pulses.

Hence, the birefringent medium (B) is suitable for providing pairs of linearly-polarized pulses (PP) from input optical pulses. The pair of pulses comprises one ordinary-polarized pulse and one extraordinary-polarized pulse that have orthogonal polarization along a first and second directions (E1, E2). The traversal of the birefringent medium (B) by the input optical pulses introduces a relative optical group delay between the ordinary-polarized pulses and the extraordinary-polarized pulses of the pairs.

The delay between the ordinary-polarized pulse and the extraordinary-polarized pulse of the pair may be approximatively equal to or greater than the pulse duration ($\tau_p$) of the input optical pulses. This ensures that the pulses of the pair do not significantly overlap in time; in other terms, the extraordinary and ordinary components of the electric field do not significantly overlap in time.

Figure 1:
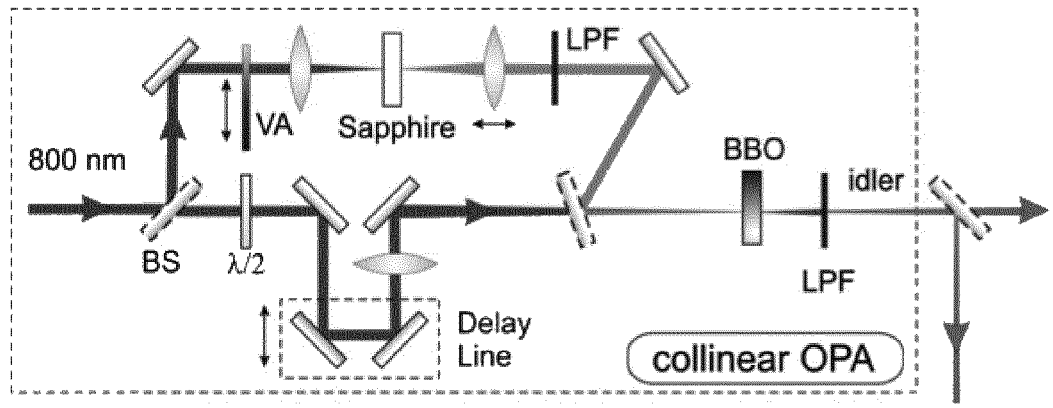
FIG. 1 illustrates an example of inter-pulse DFG scheme of the prior art.

The birefringent medium (B) avoids the use of a pulse splitter for dividing an input optical pulse into two or more output pulses. Thus, the system is more compact as no delay line is required for introducing a delay between the at least two pulses; contrary to the known prior art as represented on FIG. 1. Furthermore, no reflective optic is involved in the creation of the at least two pulses from the input optical pulse; this also improves the compactness of the system of the invention compared to the known systems.

In examples, the birefringent medium (B) may be a calcite ($CaCO_3$) crystal, a quartz plate ($SiO_2$), an $\alpha$-BBO ($\alpha$-$BaB_2O_4$) crystal, an $YVO_4$ crystal or a $TeO_2$ crystal etc.

In examples, the thickness of the birefringent medium (B) may be equal or larger than 100 μm.

In examples, the thickness of the birefringent medium (B) may be comprised between 1.5 and 6 mm.

In examples, the birefringent medium (B) may be cut at 90° from the optic axis.

In examples, the birefringent medium (B) may be oriented so that the polarization direction of the input optical pulses is sensibly at ~56° from the optic axis of birefringent medium (B).

In a specific example, the birefringent medium (B) a calcite crystal of thickness comprised between 1.5 and 6 mm, cut at 90° from the optic axis, oriented so that the polarization direction of the input optical pulses is sensibly at ~56° from the optic axis of birefringent medium (B), and where around ~30% of the energy of the input optical pulse is ordinary polarized and around ~70% of the energy of the input optical pulse is extraordinary polarized. The birefringent delay T introduced between the extraordinary and ordinary polarization of the birefringent medium (B) is about 900 femtoseconds at 1030 nm. In this example, the birefringent delay T being larger than the pulse duration of input optical pulse (P), the extraordinary and ordinary components of the electric field do not significantly overlap in time and can be considered as independent pulses.

Figure 4:
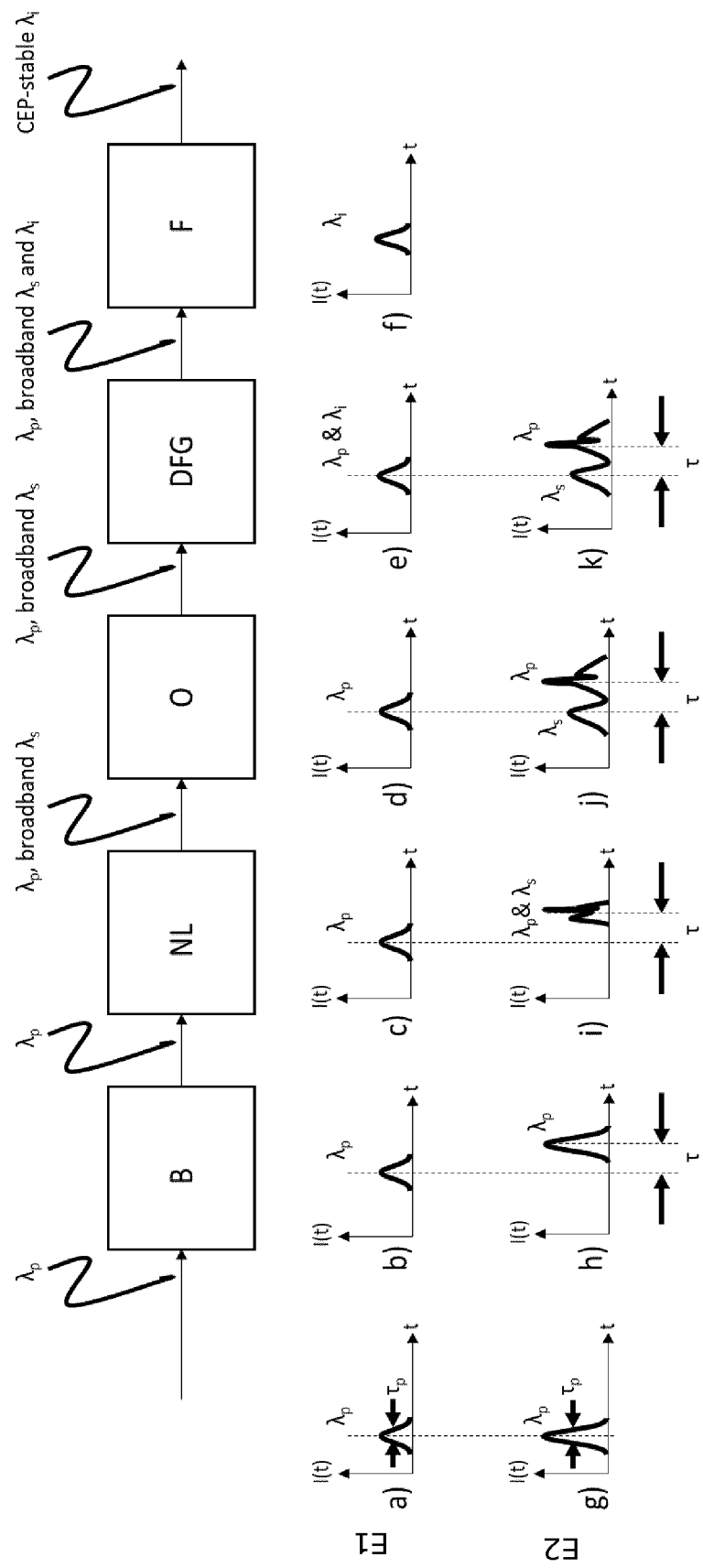
FIG. 4 shows an example the temporal profiles of the optical pulses in the system.
Figure 5:
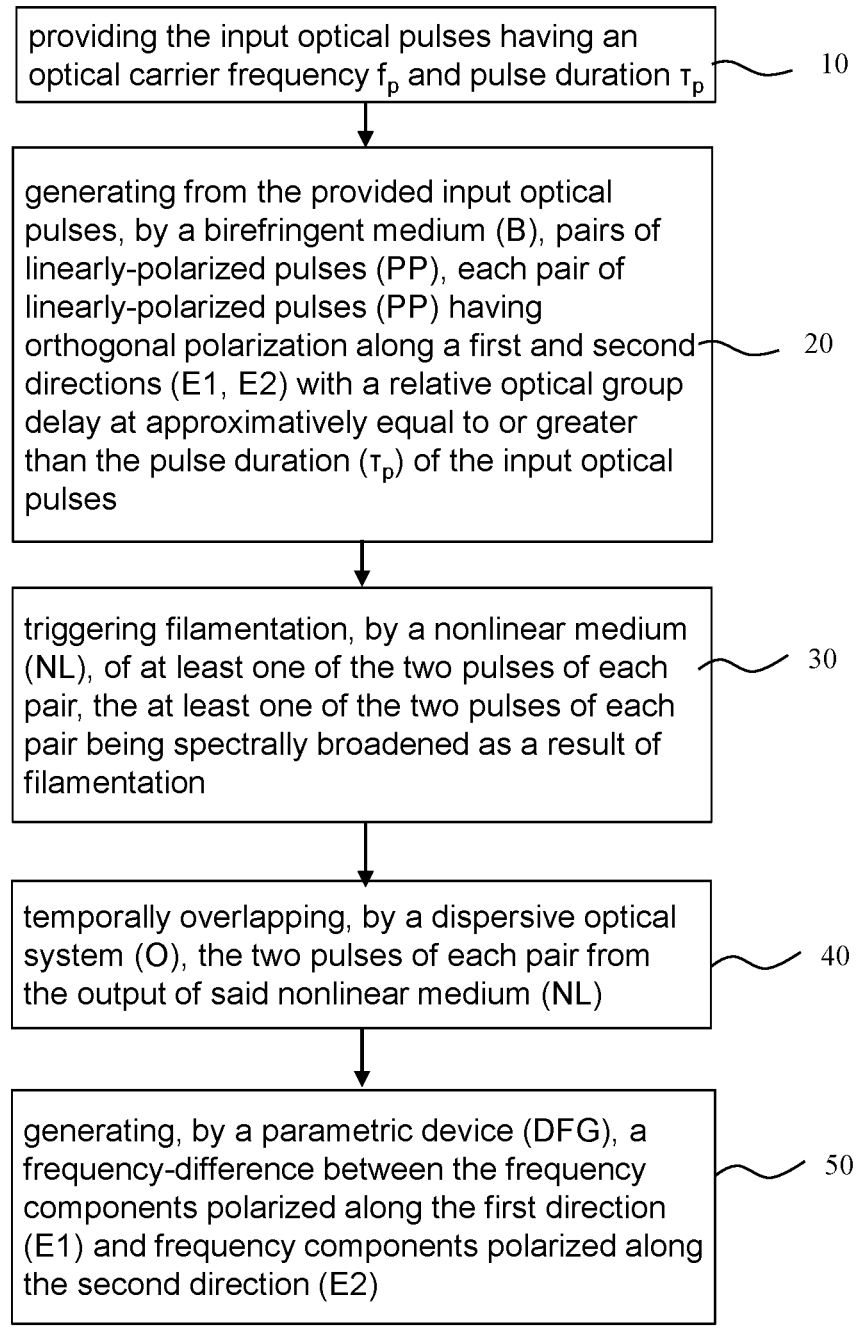
FIG. 5 shows a schematic block diagram of an example of the method of the invention.

Referring now FIG. 4, it is shown examples of the temporal profiles of the optical pulses at different points of the system according to the invention. The temporal profiles represent the variations of intensities (in W/m$^2$) of the pulses over time (in femtoseconds)

A generator (P)—not represented on FIG. 4—delivers short optical pulses. The input optical pulses have an optical carrier frequency $f_p$ and pulse duration $\tau_p$. The short optical pulses form a input beam that is linearly polarized.

The temporal profile noted 1a) represents the input optical pulses of wavelength $\lambda_p$, pulse duration $\tau_p$, along the first polarization direction (E1). The first polarization direction (E1) is parallel to the ordinary polarization direction of birefringent medium (B). The temporal profile noted 1g) represents the temporal profile of input pulses (P) along the second polarization direction (E2). (E2) is parallel to the extraordinary polarization direction of birefringent medium (B). The temporal profile of 1g) is identical to the temporal profile from 1a), except that input optical pulses (P) along the extraordinary polarization direction (E2) transport more energy.

The temporal profile noted 1b) represents the temporal profile of the input pulses of the profile 1a) at the output of birefringent medium (B). The profile of the ordinary-polarized pulses is unchanged at the output of the birefringent medium (B). Unchanged means that the profile 1b) is approximately identical the profile 1a): slight modifications of the pulses may occur because of optical dispersion, as known in the art.

The temporal profile 1h) represents the temporal profile at the output of birefringent medium (B) along the second direction (E2) of polarization. The input of the birefringent medium (B) are the pulses of the profile 1g). The temporal profile 1h) is time shifted with respect to temporal profile 1b by group delay T. The extraordinary-polarized pulses of the temporal profile 1h) do not significantly overlap in time with the ordinary-polarized pulses of the temporal profile 1b): extraordinary-polarized pulses and ordinary-polarized pulses can be considered as independent pulses. This is made possible because the delay T induced by the birefringent medium (B) is larger than the pulse duration $\tau_p$ of the input optical pulses.

Referring back to FIG. 2, the system further comprises a nonlinear medium (NL). The nonlinear medium (NL) is a media in which the polarization density responds nonlinearly to the electric field E of the pulse, as known in the art.

The nonlinear medium (NL) is adapted for receiving in input the output of the birefringent medium (B): the nonlinear medium (NL) receives in input the pairs of linearly-polarized pulses (PP). The nonlinear medium (NL) is suitable for (adapted to) spectrally broadening at least one of the two pulses of each pair received in input. The optical properties of the nonlinear medium (NL) allow triggering filamentation of the ordinary-polarized and/or extraordinary-polarized pulses. Filamentation is carried out as known in the art.

In an example, the extraordinary-polarized pulse (the one polarized along the second direction (E2)) may be intense enough to trigger filamentation and may be spectrally broadened. The ordinary-polarized pulse is not intense enough to trigger filamentation and remains essentially identical while propagating in the nonlinear medium (NL): the ordinary-polarized pulse is essentially identical as the one at the output of the birefringent material (B). At the output of the nonlinear medium (NL), because of group delay dispersion, some wavelengths of the broadened extraordinary-polarized pulse may come to the same optical group delay than the ordinary-polarized pulses.

In examples, the nonlinear medium (NL) may comprise partly or totally one or more materials selected among: YAG (Yttrium Aluminium Garnet) crystal, sapphire crystal, calcium fluoride crystal, fused silica window.

In examples, the nonlinear medium (NL) may comprise YAG crystal and is of thickness comprised between 4 and 15 mm.

In the specific example, the nonlinear medium (NL) may comprise YAG crystal, is of thickness comprised between 4 and 15 mm and the overlapping wavelengths are approximately at ~655 nm.

Referring back to FIG. 4, the temporal profile noted 1c) represents the temporal profile of the pulses of the profile 1b) provided in input of the nonlinear medium (NL). The profile of the ordinary-polarized pulses is kept unchanged at the output of the nonlinear medium (NL). Again, unchanged means that the profile 1c) is approximately identical the profile 1b): slight modifications of the pulses may occur because of optical dispersion, as known in the art.

The temporal profile noted 1i) is the temporal profile at the output of the nonlinear medium (NL) along the second direction (E2) of polarization. The temporal profile of 1i) is broadened under the combination of spectral broadening and group delay dispersion. A wavelength $\lambda_s$ is generated by the spectral broadening generated by the nonlinear medium (NL).

Referring back to FIG. 4, the output of the nonlinear material (NL) is taken as input by a dispersive optical system (O). The dispersive optical system (O) is suitable for (or adapted to) having the ordinary-polarized and extraordinary-polarised pulses partially overlap in the time domain. A first solution may be to temporally broaden the pulses so that they partially overlap in the time domain. A second solution may be to use a birefringent crystal similar to birefringent medium (B) but oriented differently to have the pulses partially overlap in the time domain. It is to be understood that both solutions can be combined. It is also to be understood that the pairs of linearly-polarized pulses (PP) provided as output of the nonlinear material (NL) may totally overlap in the time domain.

The dispersive optical system (O) may be a bulk dispersive optical system. For instance, the dispersive optical system does not comprise mirrors and/or is an assembly which is monolithically constructed.

Back to FIG. 4, the temporal profile noted 1d) represents the temporal profile of the pulses of the profile 1c) at the output of optical system (O). The profile of the ordinary-polarized pulses is unchanged at the output of the optical system (O) compared to the output of the nonlinear medium (NL).

The temporal profile noted 1j) shows the temporal profile at the output of the optical system (O) along the second direction (E2) of polarization. The temporal profile 1j) is stretched compared to the group delay dispersion of the temporal profile 1i) provided in input of the optical system (O). Interestingly, group delays of wavelength $\lambda_s$ along the second direction (E2) and of wavelength $\lambda_p$ along the first direction (E1) are equal or very close.

In examples, the dispersive optical system (O) may comprise at least one material selected among glass window, YAG crystal, Calcite ($CaCO_3$) crystal, Quartz crystal, α-BBO (α-$BaB_2O_4$) crystal, Yttrium orthovanadate ($YVO_4$) crystal, Tellurium dioxide ($TeO_2$) crystal. It is to be understood that any material with optical properties allowing to temporally broaden pulses or synchronize pulses may be selected.

In examples, the dispersive optical system may be a thick lens.

In examples, the optical system (O) may be a SF11 (glass code 785258) glass window.

In the specific example, the optical system (O) may comprise SF11 glass window of thickness comprised between 1 and 5 mm.

Referring back to FIG. 2, the system further comprises a parametric device (DFG) that is adapted to (suitable for) receive the output provided by the dispersive optical system (O). The DFG is adapted to generate a frequency-difference between frequency components polarized along the first direction (E1) and frequency components polarized along the second direction (E2). The DFG performs the frequency difference as known in the art, where the pulse polarized along the first direction (E1) acts as a "pump" pulse and the pulse polarized along the second direction (E2) acts as a "signal" pulse.

Difference-frequency generation is limited to wavelengths with equal optical group delay on the DFG medium. Hence, the frequency-difference generated is $f_p-f_s$ with $f_p$ the frequency of ordinary-polarized pulse and $f_s$ the frequency of extraordinary-polarized pulse.

In examples, the parametric device (DFG) is a nonlinear crystal of the second order that comprises at least one material selected among β-BBO (low-temperature β-phase of Barium borate), LBO (Lithium triborate noted $LiB_3O_5$), Lithium niobate ($LiNbO_3$), Lithium iodate ($LiIO_3$), LGS (Lithium gallium sulfide noted $LiGaS_2$), AGS (Silver Gallium Sulfide noted $AgGaS_2$), KTA (Potassium Titanyle Arsenate).

In examples, the parametric device (DFG) is a nonlinear crystal characterized by a second-order nonlinear susceptibility.

In the specific example, the parametric device (DFG) is a 100-μm-thick low-temperature β phase Barium borate crystal, cut at ~52.6° for a type-I phase-matching. By difference-frequency generation between components at ~655 nm ("pump" wave for the DFG crystal) and at 1030 nm ("signal" wave for the DFG crystal), an idler wave at ~1800 nm is generated.

Referring now to FIG. 4, the temporal profile noted 1*e*) shows the temporal profile at the output of the parametric device (DFG) along the first direction (E1) that comprises the temporal profile of the ordinary-polarized pulses plus the temporal profile of a third optical pulse (also referred to as "idler" pulse) having a wavelength A (also referred to as "idler" pulse) that is generated by difference-frequency generation.

The difference between the CEP of "pump" pulse and the CEP of the "signal" pulse being constant pulse to pulse, the CEP of the "idler" pulse is passively stable, in other words, reproducible from pulse to pulse.

The temporal profile noted 1*k*) is the temporal profile at the output of parametric device (DFG) along the second direction (E2). The profile of the extraordinary-polarized pulses is similar to the one previously obtained at the output of the optical system (O).

An example of the optical system has been discussed in reference with FIG. 2. Compared to inter-pulse DFG schemes, the invention is single-beam (no beam splitting), intrinsically phase-stable, and immune to beam path fluctuations. Indeed, schemes of the prior art such as the one represented on FIG. 1 require the use of a beam splitter for creating two beams from an input beam, the use of a delay line for time delaying one of the two beams, and the use of mirrors for regrouping the two beams for the DFG generation. While the present invention allows the generation and the transmission of the two beams (including one delayed beam) with a single path, that is, no mirrors and/or delay line are needed. Thus, the system according to the invention is more compact, more immune to beam disturbances. In addition, the CEP is more stable over time as there is one optical path shared by the "pump" and "signal" beams. Compared to intra-pulse DFG schemes, the invention does not require ultra-broadband input pulses, and does not require compressed pulses for the DFG stage.

In the example of FIG. 2, the system may further comprise a filter (F) that is adapted to receive the input the output of the parametric device (DFG). The filter is adapted to extract the frequency-difference of the output of the parametric device (DFG) so that the optical system only outputs the third optical pulse of wavelength $\lambda_i$. Thus, the output of the system produces only CEP-stable optical pulses of optical carrier frequency $f_i$.

In examples, the mirror may be dichroic mirror.

In the specific example, the filter may be a dichroic mirror that rejects the wavelength components at ~655 nm and at 1030 nm.

Figure 3:
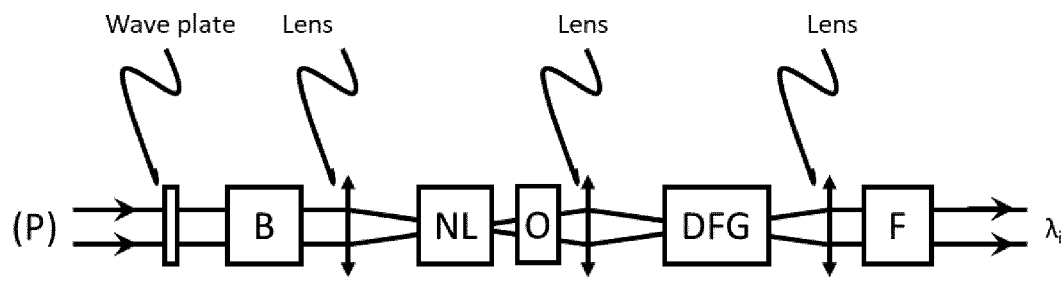
FIG. 3 shows another example of the system of the invention.

FIG. 3 is an example of the optical system of FIG. 2 with further optical elements. In this example, the system further comprises a wave plate that is located between the generator of optical input pulses and the birefringent medium (B). The wave plate is thus adapted to receiving the input optical pulses generated by the generator (P). The wave plate is further adapted to adjust the energy ratio between the pulses of the pulse pair generated in the birefringent medium (B). The polarization state of the input optical pulses is controlled by the wave plate, e.g. the energy split is balanced between the two pulses of the pulse pair to be generated by the birefringent medium. This advantageously improves the filamentation performed in the nonlinear medium (NL).

Still in reference to FIG. 3, the optical system comprises at least one optic that is placed between the optical system (O) and the parametric device (DFG). "Placed between" means that the optic is in the path of the light (the pulses) between the optical system (O) and the parametric device (DFG). Thus, the optic is adapted to take in input the output of the dispersive optical system (O) and is adapted to focus the output of the dispersive optical system (O) on the parametric device (DFG). Focusing the light improves the generation by the DFG of the frequency-difference. The optic may be in this example a lens adapted to focus an incoming beam at the output.

At least one further optic (e.g. a lens) may be placed between the birefringent medium (B) and the nonlinear medium (NL) to focus the output of the birefringent medium (B) on the nonlinear medium (NL). The filamentation is improved.

At least one further optic (e.g. a lens) may be placed between the parametric device (DFG) and the filter (F) to focus the output of the parametric device (DFG) on the filter (F). The filtering performed by the filter is improved.

The elements of the system are placed so that a light generated by a pulse generator is successively transmitted from one element to another one. For instance, in FIG. 2, the input optical pulses are successively transmitted to the birefringent medium (B), the nonlinear medium (NL), the dispersive optical system (O), and the parametric device (DFG). If the system comprises a filter, the pulses are finally transmitted to the filter. For instance, in FIG. 3, the input optical pulses are successively transmitted to the wave plate, the birefringent medium (B), a first optional optic (a lens), the nonlinear medium (NL), the dispersive optical system (O), a second optional optic (a lens), the parametric device (DFG), a third optional optic (a lens), and the filter (F).

Another aspect of the invention is now described, which concerns a method for generating carrier-envelope phase-stable (CEP-stable) optical pulses of optical carrier frequency $f_i$ from input optical pulses, the input optical pulses having an optical carrier frequency $f_p$ and pulse duration $\tau_p$. Basically, the method performs the operations carried out by the successive elements forming the system or the examples of the system discussed hereinabove.

The above method allows to improve the generation of CEP-stable optical pulses. The CEP-stable optical pulses generated by the method are intrinsically phase-stable and immuned to beam path fluctuations.

The method comprises providing (10) input optical pulses having an optical carrier frequency $f_p$ and pulse duration $\tau_p$. The input optical pulses are linearly polarized. The providing may be performed by the pulse generator previously discussed.

The method further comprises generating (20), from the provided input optical pulses, pairs of linearly-polarized pulses (PP). Each pair of linearly-polarized pulses (PP) has orthogonal polarization along a first and second directions (E1, E2) with a relative optical group delay at approximatively equal to or greater than the pulse duration ($\tau_p$) of the input optical pulses. The generation is performed by the birefringent medium (B) discussed hereinabove.

Then, the method further comprises triggering (30) filamentation of at least one of the two pulses of each pair, the at least one of the two pulses of a pair being spectrally broadened as a result of filamentation. The filamentation is performed by the nonlinear medium (NL) previously discussed.

The method also comprises temporally overlapping (40) the two pulses of each pair from the output of said nonlinear medium (NL). This is carried out by the dispersive optical system (O).

The method further comprises generating (50) a frequency-difference between the frequency components polarized along the first direction (E1) and frequency components polarized along the second direction (E2). The parametric device (DFG) performs the generation.

The method may further comprise extracting (60) the generated frequency-difference. This is performed by the filter discussed in reference to FIG. 2.

The method may further comprise focusing (42) the output of the birefringent medium (B) on the nonlinear medium (NL), and/or the optical system (O) on the parametric device (DFG), and/or the output of the parametric device (DFG) on the filter.

The method may further comprise adjusting (12) the energy split between the two pulses of the pulse pair to be generated by the birefringent medium. The wave plate can perform the adjustment.

Another aspect of the invention is now described, which concerns a light source unit for generating carrier-envelope phase-stable (CEP-stable) optical pulses of optical carrier frequency $f_i$ from input optical pulses. The light source unit comprises a generator of optical pulses having an optical carrier frequency $f_p$ and pulse duration $\tau_p$, an optical system as described hereinabove, and an optical amplifier. The optical pulses are provided in input of the optical system according to the invention, which in turn provides in output carrier-envelope phase-stable (CEP-stable) optical pulses.

The carrier-envelope phase-stable (CEP-stable) optical pulses are provided in input of the optical amplifier that provides as output amplified carrier-envelope phase-stable (CEP-stable) optical pulses. The optical amplifier is thus adapted to amplify the output of the optical system.

In examples, the pulse generator of the light source unit provides pulses with an optical carrier frequency $f_p$, a pulse duration $\tau_p$. The pulses generated by the generator are linearly polarized.

In an example, the pulse generator (P) may be a pickup from an Ytterbium laser which delivers short optical pulses of 350 fs with a pulse energy about 10 µJ à 1030 nm.

The optical amplifier amplifies directly the carrier-envelope phase-stable (CEP-stable) optical pulses generated by the optical system, that is, without the need to first convert it to an electrical signal, as known in the art. The optical amplifier may be of any type or technology.

More generally, while the present invention has been described with reference to certain examples, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not to be limited to the particular examples disclosed, but that the present invention will include all examples falling within the scope of the appended claims.

The invention claimed is:

1. A single-beam beam and compression-free optical system for generating carrier-envelope phase-stable optical pulses of optical carrier frequency $f_i$ from input optical pulses, the input optical pulses having an optical carrier frequency $f_p$ and a pulse duration $\tau_p$, the system comprising:
   a birefringent medium
      for receiving, as input, the input optical pulses; and
      for providing as output pairs of linearly-polarized pulses, each pair of linearly-polarized pulses having orthogonal polarization along a first and second directions with a relative optical group delay at approximatively equal to or greater than the pulse duration $\tau_p$ of the input optical pulses;
   a nonlinear medium
      for receiving, as input, the output of the birefringent medium; and
      for providing as output the pairs of linearly-polarized pulses with at least one of the two pulses of each pair that is spectrally broadened;
   a transparent dispersive optical system
      for receiving, as input, the output of the nonlinear medium; and
      for providing as output the pairs of linearly-polarized pulses with total or partial temporal overlap between the two pulses of each pair;
   a parametric device
      for receiving, as input, the output of the transparent dispersive optical system; and
      for providing as output a frequency-difference between frequency components of the linearly-polarized pulse polarized along the first direction and frequency components of the linearly-polarized pulse polarized along the second direction.

2. The optical system of claim 1, further comprising:
   a filter (F)
      for receiving, as input, the output of the parametric device; and for providing as output an extraction of the frequency-difference of the output of the parametric device.

3. The optical system of claim 2, wherein the filter is a dichroic mirror.

4. The optical system according to claim 1, further comprising a wave plate for controlling the polarization state of the input optical pulses.

5. The optical system according to claim 1, further comprising an optic, that is placed between the transparent dispersive optical system and the parametric device:
   for receiving, as input, the output of the transparent dispersive optical system; and
   for focusing the output of the transparent dispersive optical system on the parametric device.

6. The optical system according to claim 1, wherein the birefringent medium has a thickness that is equal or larger than 100 μm, and said birefringent medium comprises at least one crystal selected among Calcite crystal, Quartz crystal, α-BBO crystal, $YVO_4$, crystal, and $TeO_2$ crystal.

7. The optical system according to claim 1, wherein the dispersive optical system comprises at least one material selected among glass window, YAG crystal, thick lens, Calcite crystal, Quartz crystal, α-BBO crystal, $YVO_4$, crystal, and $TeO_2$ crystal.

8. The optical system according to claim 1, wherein the nonlinear medium comprises at least one material selected among YAG crystal, sapphire crystal, calcium fluoride crystal, and fused silica window.

9. The optical system according to claim 1, wherein the parametric device is a nonlinear crystal of the second order that comprises at least one material selected among β-BBO, LBO, $LiNbO_3$, $LiIO_3$, KTA, LGS, and AGS.

10. The optical system according to claim 1, wherein the parametric device is a nonlinear crystal characterized by second-order susceptibility.

11. A method for generating carrier-envelope phase-stable optical pulses of optical carrier frequency $f_i$ from input optical pulses, the input optical pulses having an optical carrier frequency $f_p$ and a pulse duration $\tau_p$, comprising:
   providing the input optical pulses having an optical carrier frequency $f_p$ and a pulse duration $\tau_p$;
   generating from the provided input optical pulses, by a birefringent medium, pairs of linearly-polarized pulses, each pair of linearly-polarized pulses having orthogonal polarization along a first and second directions with a relative optical group delay at approximatively equal to or greater than the pulse duration $\tau_p$ of the input optical pulses;
   triggering filamentation, by a nonlinear medium, of at least one of the two pulses of each pair, the at least one of the two pulses of each pair being spectrally broadened as a result of filamentation;
   temporally overlapping, by a dispersive optical system, the two pulses of each pair from the output of said nonlinear medium; and
   generating, by a parametric device and from an output of the dispersive optical system, a frequency-difference between frequency components of the linearly-polarized pulse polarized along the first direction and frequency components of the linearly-polarized pulse polarized along the second direction.

12. The method of claim 11, further comprising:
   extracting, by a filter, the generated frequency-difference.

13. The method according to claim 11, further comprising:
   focusing, by an optic, the output of the optical system on the parametric device.

14. The method according to claim 11, further comprising:
   adjusting, by a wave plate, the energy split between the two pulses of the pulse pair to be generated by the birefringent medium.

15. A light source unit for generating carrier-envelope phase-stable optical pulses of optical carrier frequency $f_i$ from input optical pulses, comprising:
   a pulse generator for delivering the input optical pulse that is linearly polarized and having an optical carrier frequency $f_p$ and a pulse duration $\tau_p$;
   an optical system according to claim 1 adapted to receive the input optical pulse; and
   an optical amplifier adapted to amplify the output of the optical system.

16. The light source unit of claim 15, the optical system further comprising:
   a filter (F)
      for receiving, as input, the output of the parametric device; and
      for providing as output an extraction of the frequency-difference of the output of the parametric device.

17. The light source unit of claim 15, wherein the filter of the optical system is a dichroic mirror and the optical system further comprises a wave plate for controlling the polarization state of the input optical pulses.

18. The light source unit of claim 15, further comprising an optic, that is placed between the transparent dispersive optical system and the parametric device:
   for receiving, as input, the output of the transparent dispersive optical system; and
   for focusing the output of the transparent dispersive optical system on the parametric device.

19. The light source unit of claim 15, wherein the birefringent medium has a thickness that is equal or larger than 100 μm, and said birefringent medium comprises at least one crystal selected among Calcite crystal, Quartz crystal, α-BBO crystal, $YVO_4$, crystal, and $TeO_2$ crystal.

20. The light source unit of claim 15, wherein the dispersive optical system comprises at least one material selected among glass window, YAG crystal, thick lens, Calcite crystal, Quartz crystal, α-BBO crystal, $YVO_4$, crystal, and $TeO_2$ crystal, wherein the nonlinear medium comprises at least one material selected among YAG crystal, sapphire crystal, calcium fluoride crystal, and fused silica window, and wherein the parametric device is a nonlinear crystal of the second order that comprises at least one material selected among β-BBO, LBO, $LiNbO_3$, $LiIO_3$, KTA, LGS, and AGS.

* * * * *